May 5, 1936.  A. COHN  2,039,886
DUCT
Filed Sept. 7, 1935   2 Sheets-Sheet 1
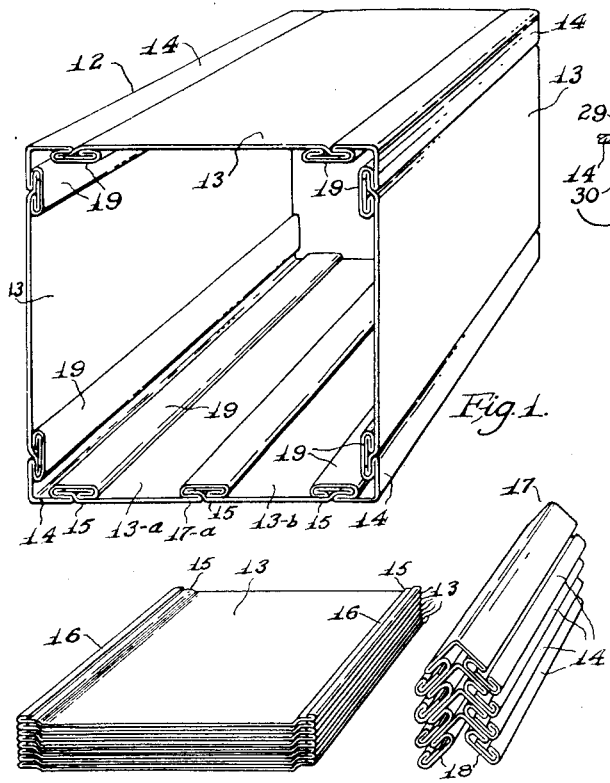
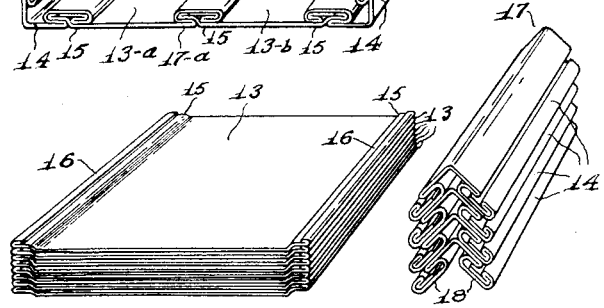
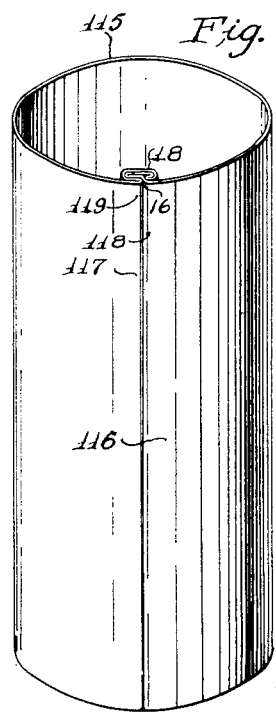
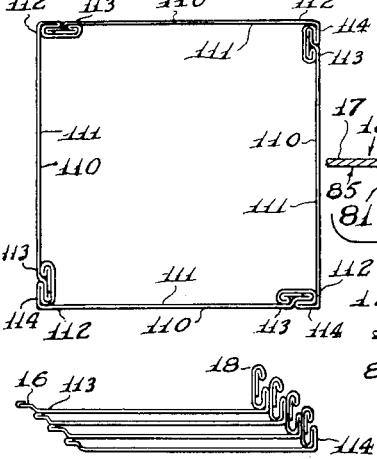
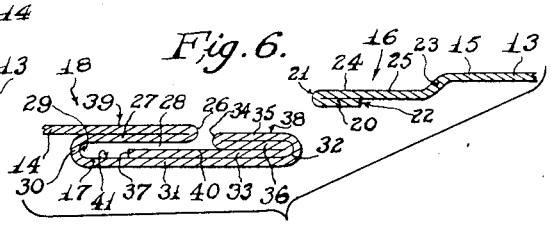
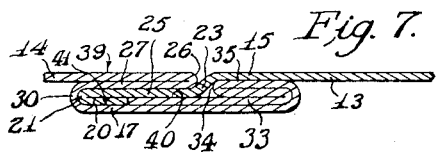
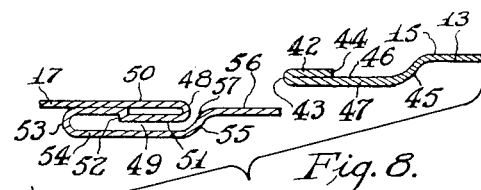
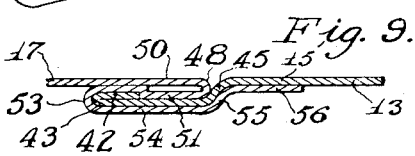
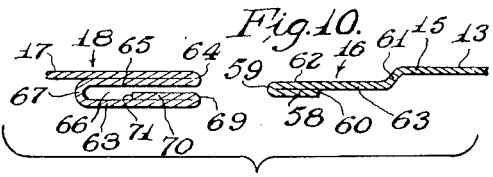
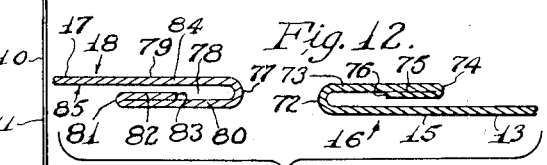
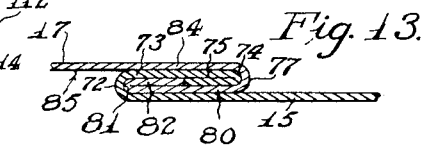
INVENTOR
Aaron Cohn
BY Morris Michael Marks
ATTORNEY May 5, 1936.　　　　　　A. COHN　　　　　　2,039,886
DUCT
Filed Sept. 7, 1935　　　　2 Sheets-Sheet 2
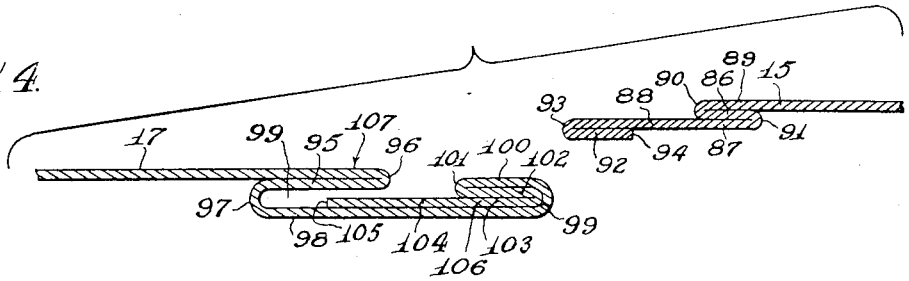
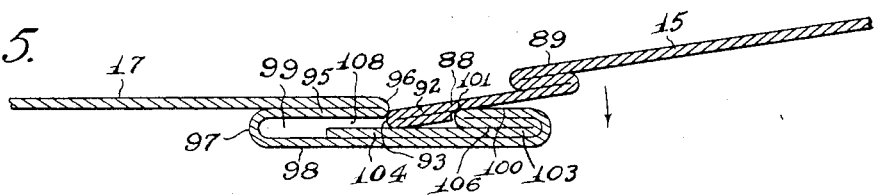
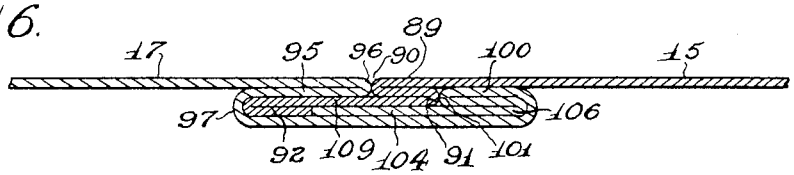
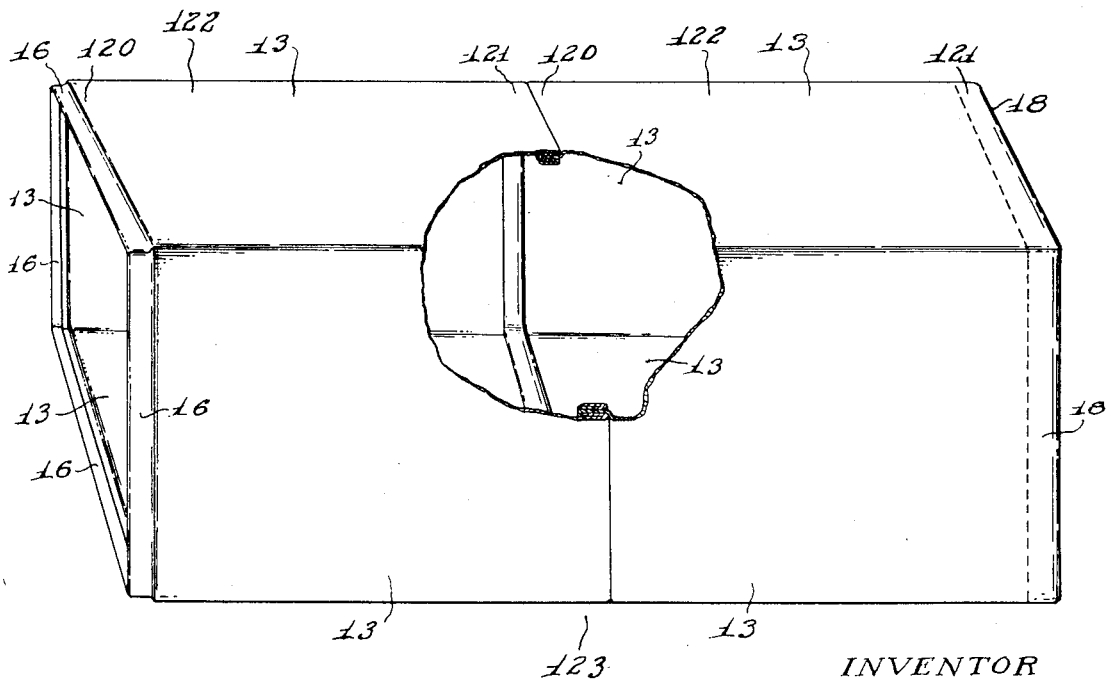
INVENTOR
Aaron Cohn
BY
ATTORNEY.

Patented May 5, 1936

2,039,886

UNITED STATES PATENT OFFICE 2,039,886

DUCT

Aaron Cohn, Philadelphia, Pa.

Application September 7, 1935, Serial No. 39,602

15 Claims. (Cl. 138—75)

My invention relates to ducts, and it relates more especially to thin-walled ducts of the kind used for conveying air, smoke, and the like.

An object of my invention is to provide duct assemblies which may be fabricated at the factory, stored or shipped without waste-space; and efficiently, sturdily, and permanently assembled on the premises without the use of tools or sealing compounds.

Another object of my invention is to provide duct assemblies of such simple construction that inexperienced laymen may easily and quickly assemble the same.

A further object of my invention is to provide means whereby basic stocked duct parts will supply any number of duct sizes and shapes.

With the above and other objects in view, my invention consists of a sheet metal duct comprising an enclosure assembly having locking edges formed integrally therewith, said locking edges comprising a male formation and a female formation; the male formation consisting of a base, a shoulder extending from said base, a tongue extending from said shoulder, and folded back on itself to a rearwardly inclined engageable edge intermediate the fold and the shoulder; and the female formation consisting of two spaced walls resiliently conjoined at their inner ends, a shoulder extending from one of said walls, and a forwardly inclined engageable edge along one wall and intermediate said inner end and said shoulder; the channel between the walls, between said engageable edge and said shoulder, being shallower than the thickness of the folded back tongue of the male formation.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawings in which like reference characters indicate like parts, Figure 1 represents a perspective view of a duct embodying my invention, greatly reduced in size.

Figure 2 represents a perspective view of duct assemblies embodying my invention in position for storage or shipping.

Figure 3 represents a front elevational view of a duct of modified construction embodying my invention.

Figure 4 represents a front elevational view of a duct assembly of the type shown in Figure 3, in position for shipping or storage.

Figure 5 represents a perspective view of a duct of the stovepipe type, embodying my invention.

Figure 6 represents a longitudinal sectional view of the male and female locking edges embodied in my invention, in unassembled position.

Figure 7 represents a sectional view of the lock-seam formed by the interlocking of the male and female edges shown in Figure 6.

Figure 8 represents a longitudinal sectional view of male and female locking edges of modified construction embodied in my invention, in unassembled position.

Figure 9 represents a sectional view of the lock seam formed by the interlocking of the male and female edges shown in Figure 8.

Figure 10 represents a longitudinal sectional view of the male and female locking edges of another modified construction, embodied in my invention, in unassembled position.

Figure 11 represents a sectional view of the lock seam formed by the interlocking of the male and female edges shown in Figure 10.

Figure 12 represents a longitudinal sectional view of the male and female locking edges of a further modified construction, embodied in my invention, in unassembled position.

Figure 13 represents a sectional view of the lock seam formed by the interlocking of the male and female edges shown in Figure 12.

Figure 14 represents a longitudinal sectional view of the male and female locking edges of another modified construction, embodied in my invention, in unassembled position.

Figure 15 represents a longitudinal sectional view of the male and female locking edges shown in Figure 14, as they appear in the first stage of the assembling or interlocking operation.

Figure 16 represents a sectional view of the lock seam formed by the interlocking of the male and female edges shown in Figures 14 and 15.

Figure 17 represents a perspective view, partly broken away, of a duct assembly of modified construction, embodying my invention.

According to my invention, I provide a sheet metal duct 12 having plane side panels 13 and angular corner-members 14, of any desired length and breadth.

The longitudinal margins 15, of the panels 13, are folded into male formations 16; and the contiguous longitudinal margins 17, of the corner-members 14, are folded into coacting female formations 18; operatively to form a lock-seam 19 when the male formation 16 and the female formation 18 are interlocked in the assembling of the duct.

If desired, the male formation may be formed on the corner members and the female formation may be formed on the panels without deviating from my invention.

In accordance with my preferred form of male formation, the margin 15 is downwardly folded back on itself to form a double-thickness tab 20 having a rounded leading edge 21 and a rearwardly projecting raw, engageable edge or abutment 22. A downwardly extending shoulder 23 is formed on the panel 13 behind the engageable edge 22, in a manner to project the tongue or male projection 24, comprising the double-thickness tab 20 and the single-thickness panel portion 25 between the engageable edge 22 and the shoulder 23, to a plane preferably two panel thicknesses lower than the plane of the panel 13.

In my preferred form of female formation, the corner-member margin 17 is formed of sheet metal of the same thickness as the panel 13; and is downwardly folded back on itself a distance substantially equal to the length of the tongue 24, to form the rounded entrance wall 26 and the upper wall 27 of the female channel 28.

At the extreme forward end 29 of the upper wall 27 the margin 17 is folded downward to form the front wall 30 of the female formation; and thereafter is folded rearwardly to form a lower wall 31, parallel to the upper wall 27 and spaced therefrom a distance equal to two panel thicknesses. The lower wall 31 extends from the front wall 30 to a point 32 a substantial distance to the rear of the channel entrance 26, and has formed on the rearward portion thereof a four-thickness platen-block 33. This block 33 is formed by the margin 17 being folded upward from the point 32, and forward upon itself, spaced from the lower wall 31 a distance equal to twice its thickness, to a point 34, forming the platen 35. The margin 17 is then folded downward and rearward, in contiguity to the platen 35, as at 36, to the point 32; and then is folded downward and forward contiguous to the fold 36 and to the lower wall 31, and extending forward beyond the channel entrance wall 26, to the raw, terminal edge 37. This terminal edge 37 forms a forwardly projecting engageable edge or abutment which is spaced from the extreme forward channel wall 30 a distance equal to or greater than the length of the male double thickness tab 20.

There is thus formed on the lower wall 31 a quadruple-thickness platen-block 33 extending generally from the vertical axis of the rearward point 32 to the vertical axis of the forward point 34 and having the upper face 38 of the platen 35 spaced from the upper face 39 of the unfolded portion of the margin 17 a distance equal to one panel thickness. There is thus also formed a double-thickness vestibule wall 40 extending from the block 33 to the engageable edge 37 and spaced from the upper wall 27 a distance equal to one panel thickness. The rounded forward edge 34 of the platen 35 serves as a forwardly inclined shoulder and as an entrance wall opposed to the entrance wall 26 and opening on the female channel 28.

The female channel 28 is thus bounded by the rounded entrance wall 34, the lower vestibule wall 40, the exposed upper face 41 of the lower wall 31, the extreme forward wall 30, the upper wall 27, and the upper rounded entrance wall 26.

In operation, when the panel 13 and the corner member 14 are assembled, the male double-thickness tab 20 is rested upon the female platen 34 and preferably guided forward thereon until the rounded leading edge 21 abuts the rounded entrance wall 26 of the female channel 28. The male formation 16 is then urged downwardly, and forwardly until the male leading edge 21 has been guided through the female channel 28 into juxtaposition to the forward female wall 30. In this manner, the double-thickness male tab 20 is urged through the normally single-thickness portion of the female channel 28, forcing the vestibule wall 40 downward against the resilience of the conjunctive forward wall 31.

In the continued forward stroke of the male formation 16, the double-thickness tab 20 terminating in the rearwardly inclined engageable edge 22 uncovers the female forwardly inclined engageable edge 37 of the vestibule wall 40, and permits the vestibule wall 40 to spring upwardly into contiguity with the single-thickness portion 25 of the male formation.

In this position, as illustrated in Figure 7, the male formation 16 is completely and sturdily embraced by the female formation 18, the male formation 16 being prevented against vertical displacement by the upper female wall 27, the lower female walls 40 and 41, and the platen-block 33; and against forward displacement by the forward wall 30 abutting against the male leading edge 21, and the entrance wall 26 abutting against the male shoulder 23. Further, the male formation 16 is prevented from rearward displacement, by the rearwardly inclined male engageable edge 22 abutting against the forwardly inclined female engageable edge 37, and by the male shoulder 23 abutting against the female entrance wall 34. Furthermore, the male and female formations 16 and 18 are so configurated, and so related to each other, that there is no possibility of passage of air through the seam of the assembled duct.

The male and female locking formations have thus been solidly and permanently locked together, and the panel 13 has been fixedly secured to the corner member 14.

By the use of the novel lock-seam embodied in my invention, quantities of similar panels 13, each having formed on the longitudinal edges 15 thereof male formations 16, may be stored or shipped together; and angular corner members 14 each having formed on the longitudinal marginal edges 17 thereof female formations 18 may be nested together for storage or shipment, all as more fully illustrated in Figure 2.

Moreover, if desired, panels 13—a of standard width may be provided, each having formed along one longitudinal margin 15 thereof, a male formation 16, and along the other longitudinal margin 17—a, thereof, a female formation 18; and a coupling-panel 13—b of similar width may be provided, having formed along both longitudinal margins 15 thereof, male formations 16. By this means, any desired panel size may be formed by interlocking the requisite number of standard panels 13—a with a standard coupling panel 13—b. Thus, by stocking a quantity of similar standard panels 13—a, standard coupling-panels 13—b and corner-members 14, a merchant is enabled to furnish his customers duct assemblies of any required size or shape.

In Figures 8 and 9 are shown a modified lock-seam construction embodied in my invention whereby the margin 15 of the panel 13 is folded upwardly back upon itself to form the double-thickness tab 42, the rounded leading edge 43, and the rearwardly inclined engageable edge 44. A downward forwardly inclined shoulder 45 is formed on the panel 13 behind the engageable edge 44 and projects the bottom face of the tongue 46, comprising the double-thickness tab 42 and the single-thickness portion 47 between the engageable edge 44 and the shoulder 45, to a plane three-panel thicknesses below the bottom face of the panel 13. This comprises the male formation.

In the female formation shown in Figures 8 and 9, the margin 17 is bent downwardly to form the rounded entrance wall 48 to the female channel 49, and is folded forwardly parallel to the unfolded portion 50 of the margin 17 and spaced therefrom a distance equal to one panel thickness, to form the upper vestibule wall 51. This vestibule wall 51 terminates at the point 52, a distance from the entrance wall 48 equal to the length of the single-thickness male portion 47. The margin 17 is bent sharply upward at 52, preferably at right angles to the vestibule wall 51 to form an engageable edge at 52; and is thereafter folded forward generally contiguous to the unfolded portion 50, to a point 53 spaced from the engageable edge 52 a distance equal to the length of the male double-thickness tab 42, whereupon it is folded downwardly to form the forward wall 53 of the female channel 49.

The margin 17 is thereafter folded rearwardly, to form the lower female wall 54, parallel to the vestibule wall 51 and spaced therefrom a distance equal to one panel-thickness, to a point opposite the entrance wall 48. The margin 17 is then folded upwardly and rearwardly to form the forwardly inclined shoulder 55 which extends to a terminal rearward fold 56, which is parallel to the unfolded portion 50, and positioned one panel-thickness beneath the plane thereof. There is thus formed a platen 56, the forward edge of which forms a rounded entrance wall 57 opposed to the rounded entrance wall 48, of the female channel 49.

In assembling operation, the male tongue 46 is rested on the female platen 56 and preferably is urged forwardly until the male leading edge 43 abuts the entrance wall 48; whereupon the tongue 46 is urged downwardly and forwardly until the leading edge 43 advances into proximity to the forward wall 52. In this manner, the lower female wall 54 is forced downwardly against the resilience of the forward wall 53, to widen the normally single-thickness portion of the female channel 49 to admit the double-thickness tab 42. As the tongue 46 progresses forward, the double-thickness tab 42 terminating in the rearwardly inclined engageable edge 44, clears the forwardly inclined engageable edge 52 of the vestibule wall 51, and the lower wall 54 springs upward to clamp the male single-thickness portion 47 between the lower wall 54 and the vestibule wall 51 and to encase the double thickness tab 42. Thus the male formation is locked against vertical or longitudinal displacement in a manner substantially similar to that of the embodiment of my invention illustrated in Figures 6 and 7.

In Figures 10 and 11 are shown another modified lock-seam formation embodied in my invention, wherein the male formation 16 comprises the panel 13 having a margin 15 folded downwardly and rearwardly upon itself, to form the double-thickness tab 58 having a rounded forward leading edge 59 and a rearwardly inclined engageable edge 60. A forwardly inclined shoulder 61 is formed behind the engageable edge 60 and projects the tongue 62, comprising the double-thickness tab 58, and the single-thickness portion 63 between the engageable edge 60 and the shoulder 61, to a plane two panel-thicknesses beneath the plane of the panel 13.

The female formation 18 comprises the margin 17 folded downwardly back upon itself to form the rounded entrance wall 64 and the upper wall 65 of the female channel 66. The wall 65 extends forward a distance equal to the length of the tongue 62, whereupon it is folded downwardly to form the extreme forward wall 67 of the female channel 66, and then is folded rearwardly to form the lower female wall 68 parallel to the wall 65 and spaced therefrom a distance equal to two panel-thicknesses. The lower wall 68 is folded upwardly back upon itself at a point 69 substantially opposite the rounded entrance wall 64, to form the vestibule wall 70 spaced from the upper wall 65 a distance equal to one panel thickness, and having a rounded entrance wall 69, and a terminal engageable edge 71 spaced therefrom a distance equal to the length of the single-thickness male portion 59.

In assembling operation the male tongue 62 is urged forwardly until the rounded sides of its leading edge 59 engage the inner rounded sides of the entrance walls 64 and 69 of the female formation 18. Further advance of the tongue 62 cams the vestibule wall 70 downwardly against the resilience of the forward wall 67, until the leading edge 59 comes into proximity of said forward wall 67, and the shoulder 61 abuts the entrance wall 64. In this process, the male double-thickness tab 58 terminating in the rearwardly inclined engageable edge 60, uncovers the forwardly inclined female engageable edge 71 of the vestibule wall 70; and the vestibule wall 70 snaps upwardly into clamping position against the single-thickness male portion 59, thereby encasing the male double-thickness tab 58 and securely locking the male formation 16 within the female formation 18.

In Figures 12 and 13 are shown another modification of the lock-seam embodied in my invention. In this embodiment, the male formation 16 comprises the panel 13 having the margin 15 folded to form the upwardly projecting shoulder 72, and the rearwardly projecting tongue 73, the tongue 73 being spaced from the panel 13 a distance equal to two panel-thicknesses. The margin 15 is then folded downwardly and forwardly upon itself as at 74, contiguous to the tongue fold 73 and forming the double-thickness tab 75 having a rearwardly projecting rounded leading edge 74, and terminating in a forwardly inclined engageable edge 76.

The female formation 18 comprises the margin 17 folded downwardly to form the extreme rear wall 77 of the female channel 78; and then is folded forwardly, parallel to the unfolded portion 79 of the margin 17, and spaced therefrom a distance equal to two panel thickness, to form the lower female wall 80. Said lower wall 80 extends forwardly to a point 81, spaced from the rear wall 77 a distance equal to the length of the male tongue 73. At the point 81, the margin 17 is upwardly folded back upon itself to form a rounded entrance wall 81, and a vestibule wall 82 contiguous to the lower wall 80, and terminating in the rearwardly inclined engageable edge 83. The unfolded portion 79 of the margin 17 comprises an upper female wall 84 and a platen face 85.

In assembling operation the male tongue 73 is rested upwardly against the female platen 85, and urged rearwardly towards the female formation 18 until the lower side of the rounded rearwardly projected male leading edge 74 of the tongue 73 cams against the upper side of the rounded forwardly projected female entrance wall 81.

Further progress in the same direction forces the female vestibule wall 82 downwardly against the resilience of the conjunctive rear wall 77 until the male leading edge 74 comes into proximity to said rear wall 77. As the male formation 16 completes its rearward course, the double thickness tab 75, terminating in the forwardly inclined engageable edge 76, uncovers the vestibule wall 82, terminating in the rearwardly inclined engageable edge 83; thereby permitting the vestibule wall to snap upwardly into clamping position against the tongue 73, and the female formation 18 completely to encase the double-thickness tab 75, thereby locking the seam, as shown particularly in Figure 13.

In Figures 14 to 16, inclusive, are shown another modification of the lock-seam formation embodied in my invention. In this embodiment, the male formation comprises the margin 15 folded downwardly back upon itself to form the fold 86 and then reversely folded to form the fold 87, contiguous to the fold 86, and projecting forward thereof to form the tongue 88. There is thus formed a step 89 having a forward wall 90 and a rearward wall 91, defining a depth preferably greater than two panel thicknesses.

The tongue 88 is downwardly folded back on itself to form a double-thickness tab 92 having a rounded, forwardly projecting leading edge 93, and a rearwardly inclined, raw, engageable edge 94 intermediate the leading edge 93 and the rearward step wall 91.

The female formation comprises the margin 17 downwardly folded back on itself to form the upper female channel wall 95 having a rounded entrance wall 96, and extending forwardly a distance equal to the length of the male tongue 88. The margin 17 is thereafter folded downward to form the forward female wall 97, and then rearward to form the lower channel wall 98 of the female channel 99. The lower wall 98 extends rearwardly, parallel to the upper wall 95, and spaced therefrom a distance equal to two panel thicknesses, to a point 99 a substantial distance to the rear of the entrance wall 96. The margin 17 is thereafter folded upwardly and forwardly upon itself to form the platen 100 parallel to the lower wall 98 and spaced therefrom a distance equal to two panel thicknesses. The platen 100 extends forwardly to a point 101 spaced from the entrance wall 96 a distance equal to the depth of the step 89; and at 101 the margin 17 is downwardly folded back on itself to form a platen-block fold 102, extending rearwardly to the point 99 and contiguous to the platen 100. The margin 17 is thereafter downwardly folded forward on itself contiguous to the fold 102 and the lower wall 98 to form a lower platen-block fold 103 and vestibule wall 104. The vestibule wall 104 terminates in a raw, forwardly inclined engageable edge 105 spaced from the forward channel wall 97 a distance equal to the length of the male double-thickness tab 92.

There is thus formed on the rearward end of the lower wall 98 a platen-block 106, having the platen 100 on the upper face thereof spaced from the plane of the upper face 107 of the unfolded portion of the margin 17, a distance equal to one panel thickness. There is also formed at the forward end of the platen 100 a rounded, forwardly inclined entrance wall 101 opposed to the rearwardly inclined entrance wall 96.

In assembling operation, the male leading edge 93 of the male tongue 88 is inserted within the entrance to the female channel 99, with the rounded upper side of the leading edge 93 abutting against the lower rounded face of the entrance wall 96, and the lower rounded side of the leading edge 93 resting on the vestibule wall 104. With these two female points of contact as a bearing, the male tongue 88 is swung about its leading edge 93, downwardly against the rounded entrance wall 101 of the platen-block 106, operatively to force the platen block 106 and the lower wall 98 on which it bears, downwardly with respect to the upper female wall 95, thereby winding the normally single-thickness vestibule channel 108 to admit the double-thickness male tab 92. Further forward progress of the male tab 92 having the rearwardly inclined engageable edge 94, uncovers the vestibule wall 104 terminating in the forwardly inclined engageable edge 105, and the vestibule wall 104 springs upwardly into clamping engagement with the single-thickness portion 109 of the tongue 88. At substantially the same instant the step 89, having the rounded forward wall 90 and the rounded rearward wall 91, slips into locking position between the rounded female entrance walls 96 and 101.

The male formation 16 is thereby securely locked within the female formation 18; the male formation being precluded from vertical displacement by the vestibule wall 104, platen 100, lower wall 98, and upper wall 95, and against longitudinal displacement by the forward wall 97, engageable edge 105 and entrance walls 96 and 101.

In Figure 3 is shown a duct of modified construction embodying my invention. This duct comprises four segments 110, each having a panel portion 111 and a "corner-member" portion 112 formed integrally therewith. The panel portion 111 has formed along its longitudinal margin 113 a male formation 16, and the corresponding "corner member" portion 112 has formed along its longitudinal margin 114 a female formation 18. The female formation is preferably formed with its forward wall contiguous to the inside surface of the panel portion 111, thereby forming a reinforcing corner frame on the duct. If desired, the male and female formations may be reversed, and the male formation 16 may be on the marginal edge 114, and the female formation 18 on the marginal edge 113.

By this means it is possible to ship or store a duct assembly of my invention in one nested package as illustrated in Figure 4.

In Figure 5, is shown another duct of modified construction embodying my invention. This applies particularly to the form of ducts known as "stove pipes."

This duct comprises an arcuate side panel 115 having longitudinal margins 116 and 117. Along one marginal edge 118 thereof, there is formed a male formation 16; and along the other marginal edge 119 thereof is formed the female formation 18, operatively to interlock into a permanent lock-seam when the stove pipe is assembled. The lock-seam may be any one of those illustrated in Figures 6 to 16 inclusive.

In Figure 17 is shown another duct assembly of modified construction embodying my invention. In this assembly, the panels 13 have formed on the transverse margins 120 of one end thereof, male formations; and on the transverse margins 121 of the opposed ends thereof, female formations 18, thereby enabling successive rudimental duct assemblies 122 to be joined together into one complete whole 123.

It will be seen that by the use of my novel invention it is possible for a manufacturer to fabricate large quantities of duct assemblies without anxiety as to undue storage space or high shipping rates occasioned by great bulk due to waste space. Moreover, by my novel invention it is possible for the layman to order shipped to him any desired size of duct assembly, and assemble the same by hand efficiently and in a modicum of time. Furthermore, the lock-seam embodied in my invention is of such construction that it is impossible to disengage the male and female locking edges thereof without intentionally prying the seam open, thereby ensuring a permanent construction to the duct of my novel invention.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent is:—

1. A lock-seam comprising a male locking margin and a female locking margin; said male locking margin being reversely folded at its leading edge, said fold terminating in an abutment contacting the unfolded portion of said locking margin throughout its length; and said female locking margin comprising spaced walls resiliently conjoined at one end thereof and defining a channel, one of said walls being inwardly folded in contacting relation to itself, said fold terminating in an abutment; said female abutment being adapted to abut against said male abutment in locking engagement therewith when said lock-seam is assembled.

2. A lock-seam comprising a male locking margin and a female locking margin; said male locking margin being reversely folded at its leading edge, said fold terminating in a rearwardly projecting abutment contacting the unfolded portion of said locking margin throughout its length; and said female locking margin comprising spaced walls resiliently conjoined at one end thereof and defining a channel, one of said walls being inwardly folded in contacting relation to itself, said fold terminating in a forwardly projecting abutment; said female abutment being adapted to abut against said male abutment in locking engagement therewith when said lock-seam is assembled.

3. A lock-seam comprising a male locking margin and a female locking margin; said male locking margin being reversely folded at its leading edge, said fold terminating in a rearwardly projecting abutment contacting the unfolded portion of said locking margin throughout its length; and said female locking margin comprising spaced walls resiliently conjoined at one end thereof and defining a channel, one of said walls being inwardly folded in contacting relation to itself, said fold terminating in a forwardly projecting abutment; said female abutment being adapted to abut against said male abutment in locking engagement therewith when said lock-seam is assembled; said female walls rearward of said female abutment being spaced less than the thickness of said male margin forward of the abutment thereof.

4. A duct comprising an enclosure assembly having a male locking margin and a female locking margin; said male locking margin being reversely folded at its leading edge, said fold terminating in an abutment contacting the unfolded portion of said locking margin throughout its length; and said female locking margin comprising spaced walls resiliently conjoined at one end thereof and defining a channel, one of said walls being inwardly folded in contacting relation to itself, said fold terminating in an abutment; said female abutment being adapted to abut against said male abutment in locking engagement therewith when said enclosure is assembled.

5. A duct comprising an enclosure assembly having a male locking margin and a female locking margin; said male locking margin being reversely folded at its leading edge, said fold terminating in a rearwardly projecting abutment contacting the unfolded portion of said locking margin throughout its length; and said female locking margin comprising spaced walls resiliently conjoined at one end thereof and defining a channel, one of said walls being inwardly folded in contacting relation to itself, said fold terminating in a forwardly projecting abutment; said female abutment being adapted to abut against said male abutment in locking engagement therewith when said enclosure is assembled; said female walls rearward of said female abutment being spaced less than the thickness of said male margin forward of the abutment thereof.

6. A lock-seam comprising a male locking margin and a female locking margin; said male margin comprising a base, a shoulder extending from said base, a male projection extending from said shoulder and reversely folded at its leading edge, said fold terminating in a rearwardly projecting abutment adjacent the unfolded portion of said male projection; and said female margin comprising spaced walls resiliently conjoined at their forward ends and defining a channel, one of said walls being inwardly folded contiguous to itself to form a multiple-thickness portion, said multiple-thickness portion extending rearward of said female channel, and folded into a male-base supporting platen terminating forwardly in a shoulder adapted to abut said male shoulder in locking engagement therewith when said lock-seam is assembled, and the forward end of said multiple-thickness portion terminating in a forwardly projecting abutment adapted to abut against said male abutment in locking engagement therewith when said lock-seam is assembled.

7. A lock-seam comprising a male locking margin and a female locking margin; said male margin comprising a base, a rearwardly projecting shoulder extending from said base, a male projection extending from said shoulder and having a leading edge, a rearwardly projecting abutment intermediate said leading edge and said shoulder, said male projection between said leading edge and said abutment being substantially thicker than said projection immediately behind said abutment; and said female margin comprising spaced walls resiliently conjoined at their forward ends and defining a channel, one of said walls being inwardly folded contiguous to itself to form a multiple-thickness portion, said multiple-thickness portion being folded into a forwardly projecting shoulder adapted to abut said male shoulder in locking engagement therewith when said lock-seam is assembled, and the forward end of said multiple-thickness portion terminating in a forwardly projecting abutment adapted to abut against said male abutment in locking engagement therewith when said lock-seam is assembled; said female walls rearward of said female abutment being spaced less than the substantial thickness of said male projection forward of the abutment thereof.

8. A lock-seam comprising a male locking margin and a female locking margin; said male margin comprising a base, a rearwardly projecting shoulder extending from said base, a male projection extending from said shoulder and having a leading edge, a rearwardly projecting abutment intermediate said leading edge and said shoulder; and said female margin comprising spaced walls resiliently conjoined at their forward ends and defining a channel, one of said walls being inwardly folded contiguous to itself to form a multiple-thickness portion, said multiple-thickness portion extending rearward of said female channel, and folded into a male-base supporting platen terminating forwardly in a shoulder adapted to abut said male shoulder in locking engagement therewith when said lock-seam is assembled, and the forward end of said multiple-thickness portion terminating in a forwardly projecting abutment adapted to abut against said male abutment in locking engagement therewith when said lock-seam is assembled.

9. A lock-seam comprising a male locking margin and a female locking margin; said male margin comprising a base, a rearwardly projecting shoulder extending from said base, and having a thickness substantially greater than said base, a male projection extending from said shoulder and having a leading edge, a rearwardly projecting abutment intermediate said leading edge and said shoulder; and said female margin comprising spaced walls resiliently conjoined at their forward ends and defining a channel, one of said walls being inwardly folded contiguous to itself to form a multiple-thickness portion, said multiple-thickness portion being folded into a forwardly projecting shoulder adapted to abut said male shoulder in locking engagement therewith when said lock-seam is assembled, and the forward end of said multiple-thickness portion terminating in a forwardly projecting abutment adapted to abut against said male abutment in locking engagement therewith when said lock-seam is assembled.

10. A lock-seam comprising a male locking margin and a female locking margin; said male margin comprising a base, a shoulder extending from said base, a male projection extending from said shoulder and reversely folded at its leading edge, said fold terminating in a rearwardly projecting abutment adjacent the unfolded portion of said male projection; and said female margin comprising spaced walls resiliently conjoined at their forward ends and defining a channel, one of said walls being inwardly folded contiguous to itself to form a multiple-thickness portion, said multiple-thickness portion being folded into a forwardly projecting shoulder adapted to abut said male shoulder in locking engagement therewith when said lock-seam is assembled, and the forward end of said multiple-thickness portion terminating in a forwardly projecting abutment adapted to abut against said male abutment in locking engagement therewith when said lock-seam is assembled.

11. A duct comprising an enclosure assembly having a male locking margin and a female locking margin; said male locking margin comprising a base, a shoulder extending from said base, a male projection extending from said shoulder and having a rearwardly projecting leading edge, a forwardly projecting abutment intermediate said leading edge and said shoulder; and said female margin comprising spaced walls resiliently conjoined at their rearward ends and defining a channel, one of said walls being inwardly folded in contacting relation to itself, said fold terminating in a rearwardly projecting abutment; said female abutment being adapted to abut against said male abutment in locking engagement therewith when said enclosure is assembled.

12. A lock seam comprising a male locking margin and a female locking margin; said male margin comprising a base, a shoulder extending from said base, a male projection extending from said shoulder and having a rearwardly projecting leading edge, said male projection being reversely folded at its leading edge, said fold terminating in a forwardly projecting abutment adjacent the unfolded portion of said male projection; and said female margin comprising spaced walls resiliently conjoined at their rearward ends and defining a channel, one of said walls being inwardly folded in contacting relation to itself, said fold terminating in a rearwardly projecting abutment; said female abutment being adapted to abut against said male abutment in locking engagement therewith when said lock seam is assembled.

13. A duct comprising panels and corner members, locking margins formed on said panels and corner members substantially throughout their length, said margins comprising a male formation and a female formation; said male formation being reversely folded at its leading edge, said fold terminating in an abutment; and said female formation comprising spaced walls resiliently conjoined at one end thereof and defining a channel, one of said walls being inwardly folded in contacting relation to itself, said fold terminating in an abutment; said female abutment being adapted to abut against said male abutment in locking engagement therewith when said duct is assembled.

14. A duct comprising a panel having a longitudinally disposed male locking margin, and a longitudinally disposed female locking margin, one of said locking margins being disposed at an angle to said panel; a plurality of adjacent offset panels, one of said offset panels having a female locking margin adapted to be interlocked with said male locking margin, and another of said offset panels having a male locking margin adapted to be interlocked with said first-mentioned female locking margin; each of said male locking margins being reversely folded at its leading edge, said fold terminating in an abutment; and each of said female locking margins comprising spaced walls resiliently conjoined at one end thereof and defining a channel, one of said walls being inwardly folded in contacting relation to itself, said fold terminating in an abutment; said female abutment being adapted to abut against said male abutment in locking engagement therewith when said duct is assembled.

15. A duct comprising a plurality of longitudinally interlocked sections; one of said sections having a transversely disposed male locking margin adapted to interlock with a juxtaposed transversely disposed female locking margin on the next adjacent section; said male locking margin being reversely folded at its leading edge, said fold terminating in a rearwardly projecting abutment contacting the unfolded portion of said margin; and said female locking margin comprising spaced walls resiliently conjoined at one end thereof and defining a channel, one of said walls being inwardly folded in contacting relation to itself, said fold terminating in a forwardly projecting abutment; said female abutment being adapted to abut against said male abutment in locking engagement therewith when said duct is assembled, and said female walls rearward of said female abutment being spaced less than the thickness of that portion of the male margin where the fold thereof contacts the unfolded portion thereof.

AARON COHN.